Oct. 14, 1924.

S. D. WELLS

HYDROMETER

Filed Aug. 15, 1922  2 Sheets-Sheet 1

1,511,549

Inventor:
Sidney D. Wells,
William L. Symons
His Atty.

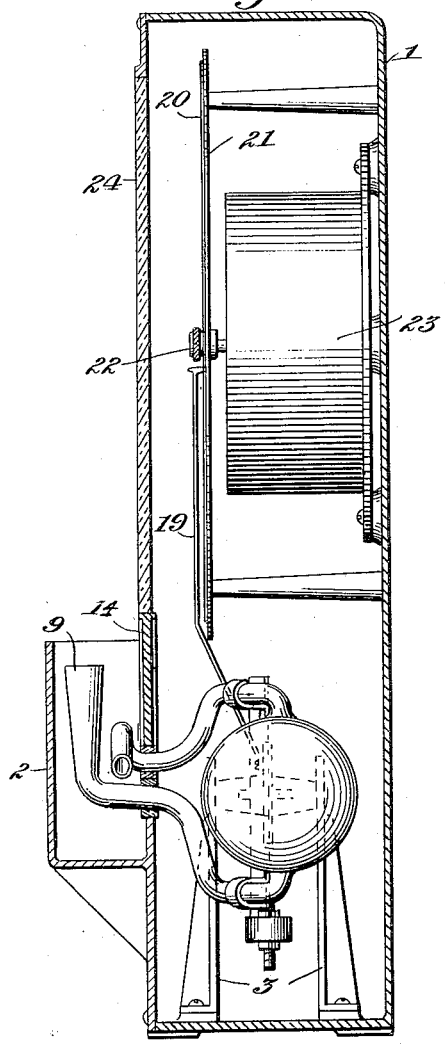
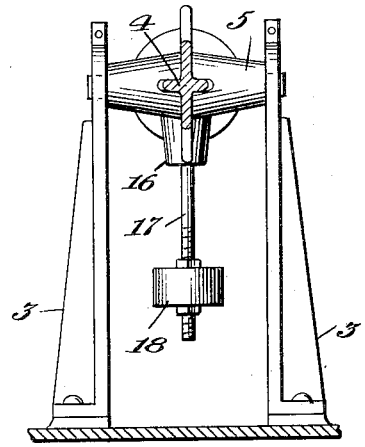
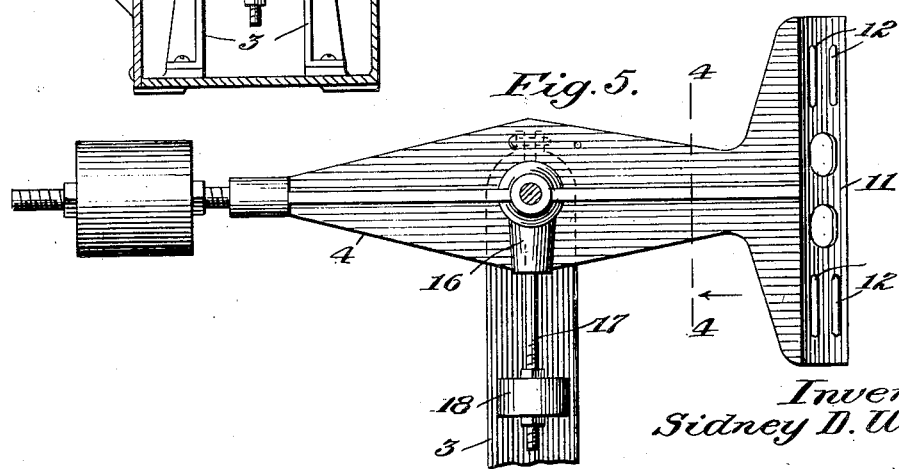

Patented Oct. 14, 1924.

1,511,549

UNITED STATES PATENT OFFICE.

SIDNEY D. WELLS, OF MADISON, WISCONSIN.

HYDROMETER.

Application filed August 15, 1922. Serial No. 582,040.

*To all whom it may concern:*

Be it known that I, SIDNEY D. WELLS, a citizen of the United States of America, residing at Madison, in the county of Dane and State of Wisconsin, have invented certain new and useful Improvements in Hydrometers, of which the following is a specification.

My invention relates to hydrometers of the kind in which a stream of fluid may pass constantly through the instrument and by which the varying specific gravity of the fluid may be constantly recorded. The object of my invention, therefore, is to construct a hydrometer through which fluid may constantly flow, which will constantly record the specific gravity of the fluid, in which the inlet and outlet openings are in a compartment partitioned off from the other parts of the instrument, in which the parts of the device subject to injury may be readily replaced with small expense and in which adjustment may be made to cover any range of specific gravity desired to be recorded.

A further object of my invention is to construct an instrument which may be adjusted to any desired range of gravity and which may be used with any chart.

With these and further objects in view, one embodiment of my invention is shown in the accompanying drawings in which:—

Figure 3 is a section on line 3—3 of Figure 1;

Figure 4 is a section on line 4—4 of Figure 5;

Figure 5 is a side view of the beam and horizontal pendent weights, the beam viewed from the same side shown in Figure 1; and Figure 6 is a plan and section of the gate for closing the opening between the casing and the compartment for the inlet and outlet tubes.

Figure 1:
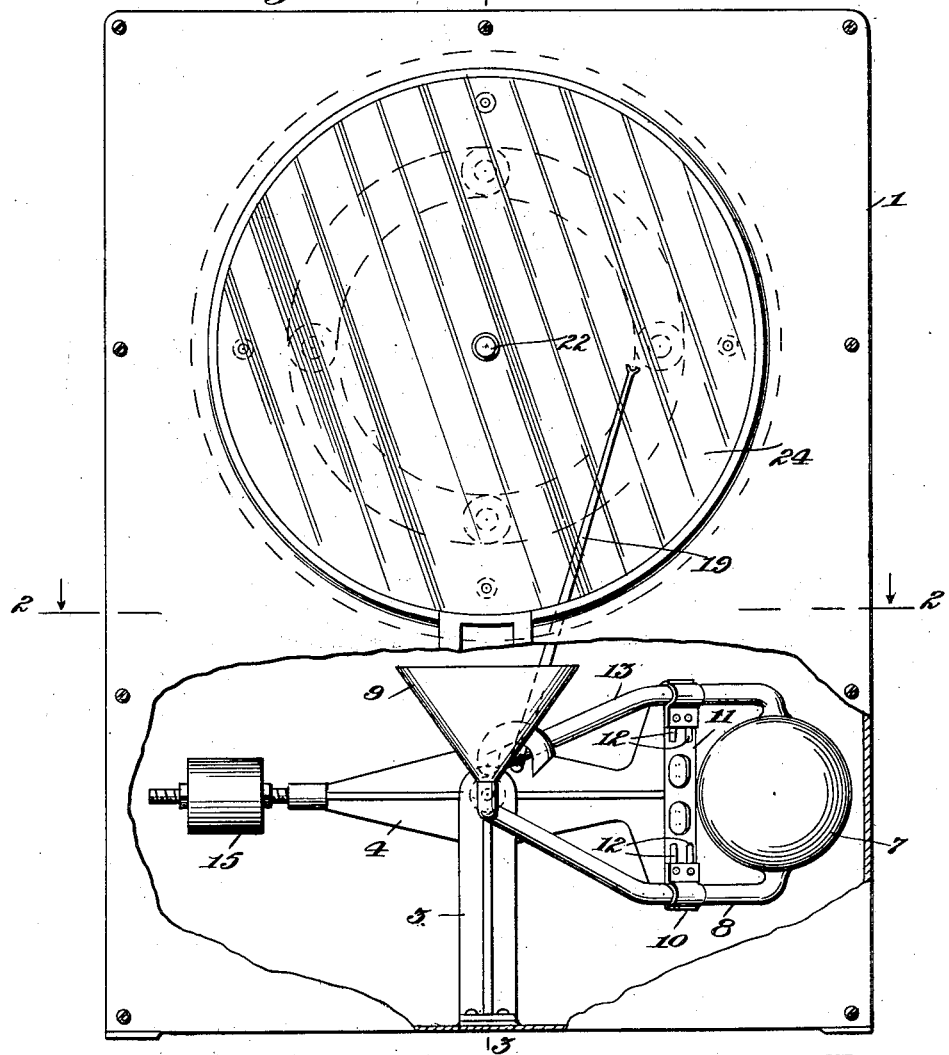
Figure 1 is a view of the instrument in elevation with a part of the cover and one compartment broken away.
Figure 2:
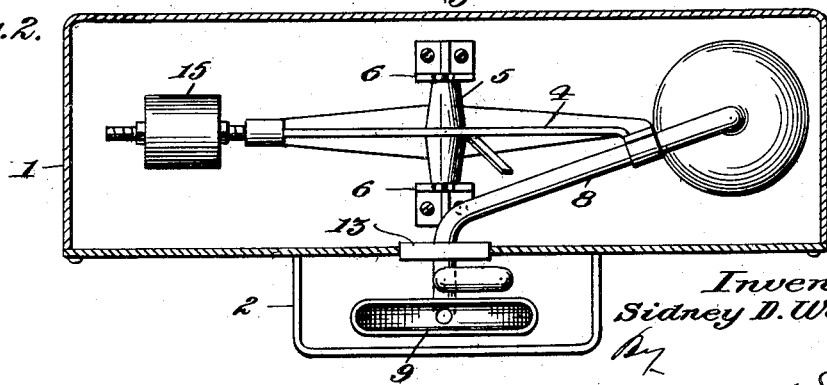
Figure 2 is a section on line 2—2 of Figure 1.

My hydrometer may be mounted in a case 1 with parts of the instrument extending through an opening in one wall and into a compartment 2 having the top thereof open. Attached to the bottom of the case are two suitable pedestals 3 at the top of which is mounted a beam 4 by means of an integral axle 5, the ends of which are journalled in the pedestals with suitable ball bearing 6 of the self adjusting type.

A spherical vessel 7 has an inlet tube 8 with a funnel shaped mouth 9. This tube is attached to the balancing beam by a clamping plate 10 which fits on the flat end 11 of the beam. This plate may be attached to the beam by screws or any other desirable means, not shown. The slots 12 in the flat end of the beam allow the attachment thereto of a fluid containing vessel having arms of different distances between them, while the plates may be made to clamp tubes of different sizes. An outlet tube 13 for the fluid containing vessel is attached to the beam in the same manner as the inlet tube. The ends of the outlet and inlet tubes are outside of the case and are separated therefrom by means of a gate 14. The object of the gate is to enable the attachment of the front of the case after installation of the balance with the glass bulb and extending inlet and outlet tubes. As the inlet and outlet tubes pass through the opening between the case and the outer compartment as nearly as possible in line with the pivotal axis of the beam, the opening may be of substantially the same size as a circle circumscribing the tubes at that point and the space between the tubes may be filled with a cork or any other means of substantially closing the hole without touching the wall and impeding the free movement of the beam. The inlet and outlet tubes at this point should be as close together as the glass blowers' art will permit, thereby making possible the smallest possible opening. The end of the outlet tube in the compartment is bent in the shape of a goose-neck. To balance the spherical vessel on the beam is a weight 15. This weight is adjustable by having it screw-threaded on the end of the beam. It will be obvious that different size weights may be used. Extending from a socket 16 in the axle of the beam is a rod 17 having on the end thereof a weight 18 which is adjustable by means of the screw-thread attachment to the rod. Different size weights may obviously be used on this pendent weight or balance. While arms for weights 15 and 18 are at right angles to each other, the adjustable feature obtained may be obtained by using two or more weights on arms, making other angles to each other. The use of two weights on arms at an angle to each other gives the same effect as one weight on an arm extending between the two and by altering the relative distance of the weights from the axis adjustment is possible which could be duplicated with one weight on an arm which could be adjusted angularly. In other words the single weight would be the component of the two weights and in effect would be employing the same principle. The combination of two weights is more satisfactory mechanically and is consequently used. Attached to the beam in any suitable manner as by a screw or bolt is a pen arm 19 having at the end thereof the usual recording pen. This pen records the movement of the beam on a chart 20 which may be made of standard size attached to the dial 21 by means of a clamping screw 22 which is a part of the usual recording clock 23 which is attached to the back of the case. As indicated the case may have a glass plate 24 as a part of the front cover extending the length of the diameter of the dial. This is merely to afford protection to the contents of the case and may be substituted by a hinged door, a bezel, or any other means used for the purpose.

It is understood that the fluid to be tested and recorded is piped to the case in suitable conduits, not shown, which empty into funnel 9 without touching same and it is conducted from the case in suitable conduits, also not shown, into which outlet tube 13 can discharge without touching. It is obvious that compartment 2 may also be provided with a cover or guard to prevent tampering with the instrument by unauthorized persons.

The operation of my device will be obvious from the above description. My device because the moving and recording parts thereof are separated from the ends of the fluid inlet and fluid outlet tubes may be used to measure the specific gravity of fluids having corrosive characteristics. It will be obvious also that by means of the use of the horizontal balancing weight and the pendant balancing weight, my instrument is adapted to be used with fluids having a wide range of specific gravity. The movement for any change in gravity can be regulated either by changing the distance of the pendant weight from the axis, by changing the weight, or by a combination of both. It is, therefore, possible to adjust the instrument to cover any range of gravity desired and one model can be used to cover the entire field. In the old style of instrument, such as is illustrated in my Patent No. 1,369,510 of February 22, 1922, one instrument could only be used for a certain range and a different range could only be obtained by the use of an instrument with a different angle between the weight arm and the line connecting the center of gravity of the vessel with its axis.

Having described my invention, what I claim and desire to protect by Letters Patent is:

1. A device of the kind described comprising a case, a vessel for holding fluid mounted in said case, a balancing beam in said case, said vessel being attached to said beam, inlet and outlet tubes connecting with said vessel, the ends of said inlet and outlet tubes extending outside of said case, said ends being substantially in line with the axis of the balancing beam.

2. A hydrometer comprising means for constantly measuring the weight of a fluid, means co-operating with said measuring means for constantly recording said weight and means to regulate the movement of the recording means, said means comprising a combination of adjustable weights.

In testimony whereof I affix my signature.

SIDNEY D. WELLS.